Oct. 20, 1936.  H. K. PINKERTON ET AL  2,058,175
APPARATUS FOR PRODUCING WHOLE WHEAT OR LIKE FLOUR
Filed June 5, 1933  2 Sheets-Sheet 1
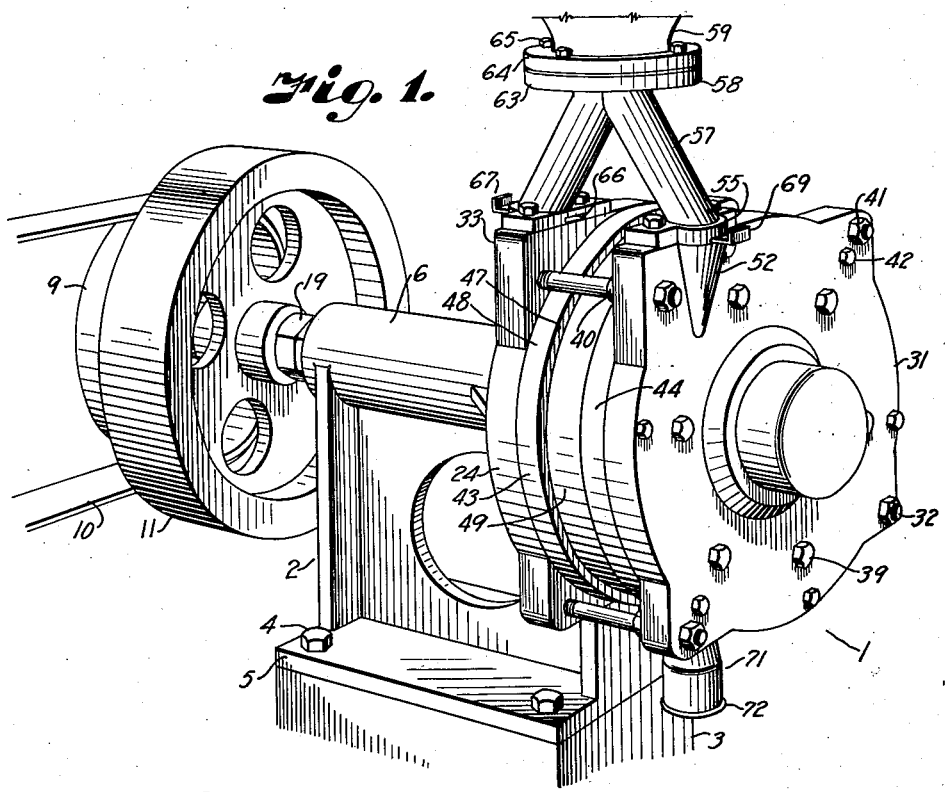
INVENTORS
Howard K. Pinkerton and
Gerald A. Tipton.
BY
ATTORNEY Oct. 20, 1936. H. K. PINKERTON ET AL 2,058,175
APPARATUS FOR PRODUCING WHOLE WHEAT OR LIKE FLOUR
Filed June 5, 1933 2 Sheets—Sheet 2
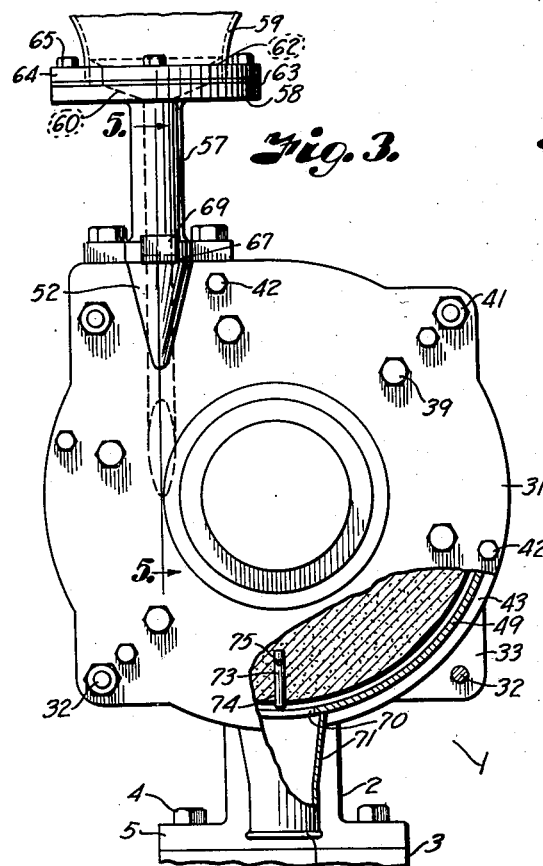
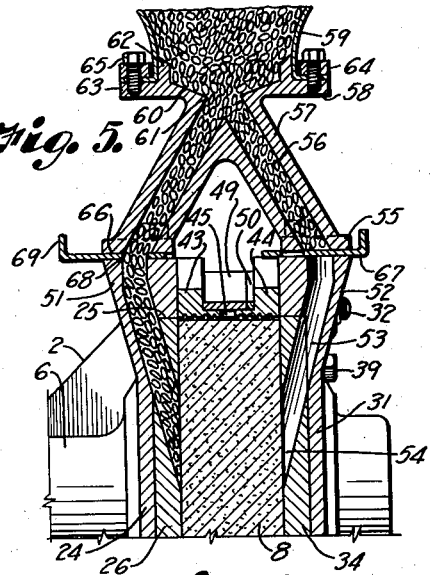
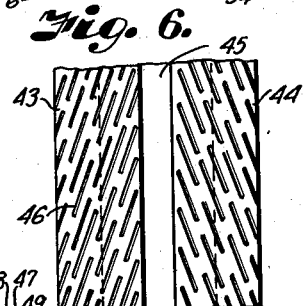
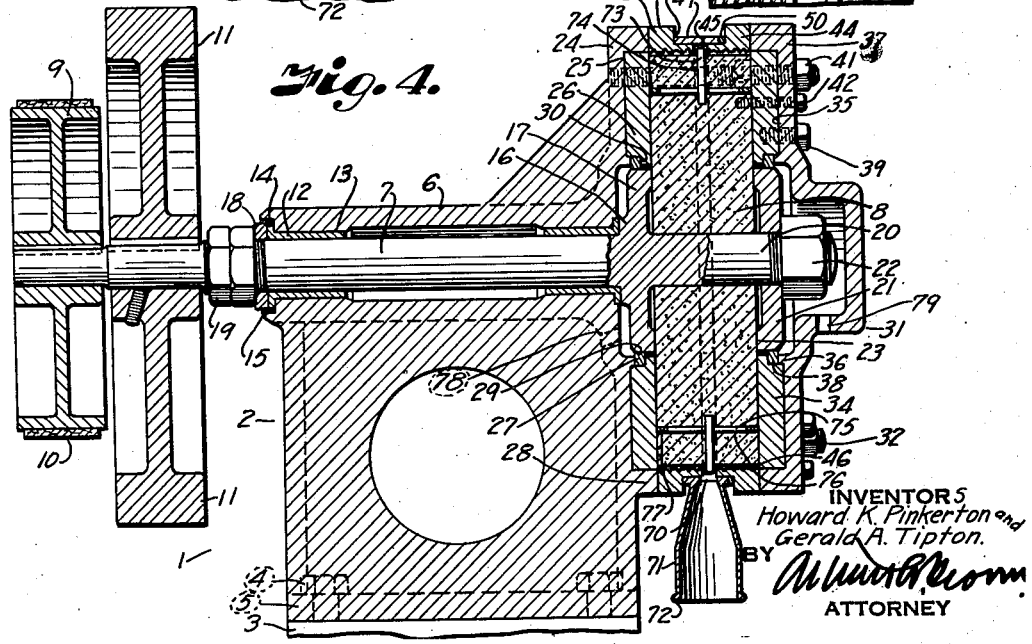
INVENTORS
Howard K. Pinkerton and
Gerald A. Tipton.
BY
ATTORNEY Patented Oct. 20, 1936

2,058,175

UNITED STATES PATENT OFFICE 2,058,175

APPARATUS FOR PRODUCING WHOLE WHEAT OR LIKE FLOUR

Howard K. Pinkerton and Gerald A. Tipton, Quincy, Ill.

Application June 5, 1933, Serial No. 674,318

5 Claims. (Cl. 83—8)

Our invention relates to an apparatus for producing whole wheat or like flour.

In producing wheat flour, corn meal, and the like, by ordinary milling processes it is customary to eliminate the bran and germ of the grain, thus enhancing appearance and preserving quality of the flour but denuding it of protein, fat and mineral content of the whole grain.

It is the principal object of our invention to provide an apparatus particularly adapted for household and individual baking use, whereby flour containing all of the food and health promoting values of the original grain berries may be preserved and sweetness of baked products insured by production of the flour only as it is required for use and consequent avoidance of exposure of germ content of the grain for any considerable period.

In accomplishing these and other objects of our invention we have provided improved apparatus including details of structure, the preferred form of which is illustrated in the accompanying drawings, wherein:

Fig. 1 is a perspective view of a grinder constructed in accordance with our invention.

Fig. 2 is a perspective view of the wheel and housing elements of the grinder in disassembled relation.

Fig. 3 is an elevational view of the grinder with a portion shown in section to disclose the grinding wheel and a clearing pin mounted in the wheel.

Fig. 4 is a transverse, central, vertical section through the grinder.

Fig. 5 is a fragmentary section on the line 5—5, Fig. 3, showing valved conduit branches for feeding grain to opposite sides of the grinding wheel.

Fig. 6 is a fragmentary view in elevation of the inner faces of a pair of peripheral grinding rings.

Referring more in detail to the drawings:

1 designates the grinder, including a frame 2 which may be rigidly supported on a floor, a block 3 or suitable base by bolts 4 extending through a foot portion 5 of the frame into the block or other base. The upper end of the frame preferably comprises a tubular housing 6 for a shaft 7 carrying the grinding wheel 8 on one end and a driving pulley wheel 9 on its opposite end, a belt 10 being run over the pulley wheel 9 and connected with a suitable source of power (not shown) for operating the shaft, a fly wheel 11 on the shaft stabilizing operation of the wheel.

The bearing for the shaft preferably consists of bushings 12 pressed into constricted ends 13 of the housing 6, and having end flanges 14 seated in recesses 15 in the ends of the frame, although ball or roller bearings may obviously be substituted for the bushings. The shaft is anchored against endwise play by the hub 16 of a disk 17 preferably formed integrally with the grinding wheel end of the shaft and a washer 18 held against the flange of the opposite bushing by lock nuts 19. The shaft has a stud portion 20 extended beyond the disk 17 to receive the grinding wheel, and the wheel is held on the shaft by a follower plate 21 slidable on the shaft and which is pressed toward the wheel by a nut 22 on the outer end of the shaft, the disk 17 and follower plate 21 having registering annular flanges 23 engaging opposite faces of the wheel to firmly grip the wheel therebetween and effect driving connection thereof with the shaft.

Cast integrally with the frame 2 is an end plate 24 having an annular recess 25 in its outer face for seating an inner grinding plate 26, the ring 27 at the inner edge of the recess being of less depth than the outer ring 28 to receive a packing ring 29 between its edge and a shoulder 30 on the plate 26 for sealing the joint between the plate and disk 17 to prevent escape of flour from the wheel chamber into the shaft bearing.

A cap or cover plate 31 adjustably fixed to the main frame by stud bolts 32 carried by corner bosses 33 on the frame plate 24 serves to house the outer side of the grinding wheel and as a support for the outer grinding plate 34, the inner face of the cover plate having an annular recess 35 formed by rings 36 and 37 corresponding to and registering with the rings 27 and 28 on the frame plate 24 for seating said plate 34, a packing ring 38 being interposed between the plate 34 and cap plate 31 as at the inner side of the grinding wheel. The grinding plates 26 and 34 are held in assembled relation with the frame and cover plates 24, 31, by screws 39 extending through the plates into respective rings, and spacing of the cover plate 31 from the grinding wheel is effected by lock nuts 40 on the bolts 32 at the inner side of the cover plate and nuts 41 at the outer end of the plate. The grinding plates are preferably constructed of steel, heat treated to condition them for resistance to the grinding action to which they are subjected during operation of the mill.

Fixed to the facing sides of the frame plate 24 and cover plate 31, by cap screws 42 are ring members 43, 44 of a diameter to closely surround the periphery of the grinding wheel and of width to provide a space 45 therebetween when the mill is assembled, the inner faces of the rings having staggered, interrupted grooves 46 therein inclined from the outer edges of the rings toward the space 45 between the rings in direction of travel of the grinding wheel, so that meal entering between the periphery of the wheel and the inner surfaces of the rings will be further reduced and moved from groove to groove to delivery into the central annular space 45.

Each of the rings 43, 44 has a shouldered recess 47 at its inner edge forming a flange 48 registering with a corresponding flange on the mating ring to form a seat for a cover ring or band 49 that surrounds the flanges and closes the space 45 between the rings to prevent escape of flour from said space when the mill is in operation, the band 49 being of less width than that of the space between the walls of the recesses 47 to provide space for a gasket 50, that serves to seal the cover ring and permit lateral adjustment of the grinding wheel and cover plate 31.

Extending through the grinding plates 26 and 34 at opposite sides of the grinding wheel and through bosses 51 and 52 on the frame and cover plates 24 and 31 are inclined channels 53 having floor portions forming an angle with the sides of the grinding wheel and whereon the grain berries are wedged against rotation, the channels terminating at their lower ends in elongated ports 54 preferably of elliptical formation and arranged with their axes extending along cords at the side faces of the wheel, the upper ends of the channels being extended vertically for a short distance to form valve sections 55 and thence inwardly for communication with channels 56 in legs 57 on the base 58 of a hopper 59 supported on the bosses 51, the hopper base having an inclined bottom 60 provided with a central opening 61 through which grain is fed to the leg channels 56, and having an upstanding ring 62 forming a guide and brace for the throat of the hopper body 59, the edge of the throat being curved laterally to seat on the rim 63 of the base 58 and be secured thereto by a clamp ring 64 and bolts 65.

The vertical sections of the channels 56 are intersected by horizontal slots 66 in the frame and cover plates 24, 31, and slidable in said slots are valve plates 67, having openings 68 adapted to register with the channels for supplying grain to the grinding wheel, and with exterior handle flanges 69 whereby the plates may be moved to open or close the channels.

Instead of mounting the valve plates 67 in a horizontal plane at a point near the upper ends of the bosses 51 and 52, it may be found advantageous to insert equivalent plates in suitable slots intersecting enlarged portions of the channels 53 at points adjacent the side faces of the grinding wheel so that the effective cross sectional areas of the channels at their discharge ends could be controlled to allow more or less grain to come into contact with the wheel. With the latter construction feeding of grain to the wheel would be interrupted immediately upon closing the valve plates.

For outlet of the ground material from the machine the band 49 is provided with a port 70, and a spout 71 of suitable shape is fixed, as by welding, to the band in registry with the port 70, an outwardly projecting bead 72 on the lower end of the spout providing anchorage for a bag or container having its mouth tied over the spout.

To prevent any possible packing of the ground material in the circular space or passageway 45, clearing pins 73 seated in and projecting from radial sockets 74 of the grinding wheel are anchored in any suitable manner in the sockets, as by lock pins 75 extended through the pins 73 and through transverse openings 76 of the wheel. The lock pins should be made shorter than the thickness of the wheel and the remaining portions of the transverse openings 76 filled with lead slugs or the like 77 to positively prevent displacement of the lock pins. It will be apparent that at least two clearing pins should be used at points diametrically opposite each other to maintain a perfectly balanced grinding wheel.

The clearing pins act also as a fan, thus supplying, to a certain extent, the necessary ventilation required in grinders of this character for preventing generation of excessive heat which would damage the flour. To augment this ventilation, ports 78 and 79 are preferably provided in the frame 2 and cover plate 31 respectively, so that air entering the ports and passing the rings 29 and 38 will travel across the side faces of the wheel and thence across the periphery thereof to the space 45 for discharge with the flour through the outlet spout 71.

It is to be noted that the packing rings 29 and 38, while fitted snugly in their respective positions to prevent flow of dust into the bearings of the mill, will allow passage of a limited amount of air into the interior of the grinder housing.

In using a mill constructed and assembled as described for producing whole wheat flour or the like, when the grinding wheel is rotating at full speed the valves controlling flow from the hopper are opened and grain delivered through the inclined channels to contact with the side faces of the wheel under the slight pressure induced by head of the column of grain in the channel, so that the grinding surface of the wheel reduces the grain berries progressively by cutting or chipping to flour or meal particles of a predetermined maximum size as distinguished from wearing down or crushing the grain to particles of indeterminate size.

With the apparatus described, it is also possible to readily reduce all of the parts of a grain berry, such as wheat, to the fineness of flour. With the methods heretofore used, like results have been impossible and it has been necessary to resort to bolting or sifting of the flour to eliminate those portions of the grain berry which were not reduced to flour fineness and were consequently lost from the flour for food purposes.

Particles of the grain berries received by the wheel are carried toward the rim of the wheel by centrifugal force, being further reduced by rubbing contact with the wheel and faces of the housing plates, and when reaching the rim pass into the space between the periphery of the wheel and the inner surface of the grooved rings 43, 44, being there picked up and conducted inwardly toward the circular passageway 45 by rotation of the wheel and direction inducing arrangement of the grooves in the rings, the grain particles or meal being further reduced by grinding, rubbing and cutting action of the wheel and grooved surfaces of the rings, so that the material reaches the passageway 45 in the form of very fine flour. The clearing pins on the wheel prevent any possible packing of the flour in the passageway and create a draft tending to carry the flour through the passageway to the spout 71, through which it is discharged into a bag or receptacle suspended from the spout or otherwise supported thereunder.

The clearing pins, together with the ports 78 and 79, also provide for the necessary ventilation required for insuring flour of highest quality.

Fineness of the flour produced by the mill may be regulated by adjusting the housing plates 24, 31, relative to the sides of the grinding wheel.

It is apparent that with the apparatus described a user may produce flour of the degree of fineness he may desire, and in quantities as required, thereby insuring freshness and benefit of all food and health promoting values in the grain from which the flour is produced.

What we claim and desire to secure by Letters Patent is:

1. Apparatus of the character described including a wheel having a grinding surface on its side and peripheral faces, a plate adjacent the side face of the wheel, spaced ring members having inner grinding surfaces extending over said peripheral surface of the wheel and forming an annular passageway about the wheel, means surrounding the rings to close the passageway and having a discharge port, means for rotating the wheel, and means for conducting grain to contact with the side of the wheel.

2. Apparatus of the character described including a wheel having side and peripheral grinding faces, a housing for the wheel including side plates arranged closely adjacent the side faces of the wheel and spaced grinding rings carried by said plates about the periphery of the wheel forming an annular passageway about the wheel, a band surrounding the rings for closing the passageway and having a discharge port, means for rotating the wheel, and means for conducting grain to the side faces of the wheel for movement by centrifugal force generated by rotation of the wheel to said peripheral face and over said peripheral face to the annular passage for discharge through the port.

3. Apparatus of the character described including a wheel having a peripheral grinding face, plates adjacent the side faces of the wheel, a ring carried by each plate and extending partly over said peripheral surface to form an annular passageway between the rings, said rings having grooves in their inner surfaces inclined toward said passageway in the direction of travel of said wheel, means surrounding the rings for closing the passageway and having a discharge port, means for rotating the wheel, and means for conducting grain to the side faces of the wheel.

4. Apparatus of the character described including a wheel having side and peripheral grinding faces, plates adjacent the side faces of the wheel, a ring carried by each plate and extending partly over said peripheral surface to form an annular passageway therefrom, means surrounding the rings for closing said passageway and having a discharge port, means projecting from the periphery of the wheel into said passageway, means for rotating the wheel, and means for conducting grain to the side faces of the wheel.

5. In an apparatus of the character described, a wheel having a side grinding surface, a housing for the wheel, means for rotating the wheel in the housing about a fixed axis, and means connected with the housing and forming a passageway spaced laterally from said side grinding surface and terminating at a point within the circumferential boundary of said grinding surface to support a column of grain berries for movement in the rotational direction of the wheel and out of contact with said grinding surface, the passageway terminating at said point in a wedge-shaped pocket having a floor portion forming an angle with the grinding surface whereon the grain berries are wedged against individual rotation, and having an elliptical port located with its major axis extending on a cord of the wheel for exposing the wedged grain berries to the grinding action of said surface so that the grain berries are progressively attrited by said surface incidental to their non-rotative support by said pocket responsive to influence of the column of grain berries in said passageway.

HOWARD K. PINKERTON.
GERALD A. TIPTON.